(12) United States Patent
McGrail et al.

(10) Patent No.: US 11,988,791 B2
(45) Date of Patent: May 21, 2024

(54) SPARSE SEISMIC DATA ACQUISITION

(71) Applicant: TGS-NOPEC Geophysical Company, Houston, TX (US)

(72) Inventors: Adrian McGrail, Houston, TX (US); Paul Farmer, Houston, TX (US)

(73) Assignee: TGS-NOPEC Geophysical Company, Houston, TX (US)

( * ) Notice: Subject to any disclaimer, the term of this patent is extended or adjusted under 35 U.S.C. 154(b) by 882 days.

(21) Appl. No.: 16/891,817

(22) Filed: Jun. 3, 2020

(65) Prior Publication Data
US 2020/0379138 A1    Dec. 3, 2020

Related U.S. Application Data

(60) Provisional application No. 62/856,680, filed on Jun. 3, 2019.

(51) Int. Cl.
*G01V 1/38* (2006.01)
*G01V 1/09* (2006.01)
*G01V 1/20* (2006.01)

(52) U.S. Cl.
CPC .............. *G01V 1/3843* (2013.01); *G01V 1/09* (2013.01); *G01V 1/201* (2013.01); *G01V 1/3808* (2013.01);
(Continued)

(58) Field of Classification Search
CPC ............... G01V 2210/1293; G01V 2210/1423
See application file for complete search history.

(56) References Cited

U.S. PATENT DOCUMENTS 7,391,673 B2    6/2008  Regone
8,705,317 B2    4/2014  Houck
(Continued)

FOREIGN PATENT DOCUMENTS

WO         2012041844 A1    4/2012
WO    WO-2012041844 A1 *  4/2012    ............... G01V 1/02
(Continued)

OTHER PUBLICATIONS

International Search Report for International Application No. PCT/US2017/025299 dated Jun. 20, 2017, from the European Patent Office.
(Continued)

*Primary Examiner* — Krystine E Breier
(74) *Attorney, Agent, or Firm* — Sage Patent Group

(57) ABSTRACT

Embodiments herein use an acquisition vessel towing a plurality of receivers and a seismic source and a source vessel towing a seismic source to acquire seismic data corresponding to a subsurface below a bottom surface of a body of water. When activating the seismic source on the acquisition vessel, the plurality of receivers acquire survey data for a central coverage area underneath a swath defined by the plurality of receivers. However, when activating the seismic source on the source vessel, the plurality of receivers acquires survey data for a side coverage area. The embodiments herein control a separation distance between the acquisition and source vessels so that there is a gap between the central and side coverage areas resulting from activating the seismic sources towed by those vessels. This gap can reduce the cost and time required to perform the seismic survey.

18 Claims, 9 Drawing Sheets

(52) U.S. Cl.
CPC ............... *G01V 2210/1293* (2013.01); *G01V 2210/1423* (2013.01)

(56) References Cited

U.S. PATENT DOCUMENTS

| | | |
|---|---|---|
| 8,724,429 B2 | 5/2014 | Houck |
| 9,261,619 B2 | 2/2016 | Mandroux |
| 9,581,712 B2 | 2/2017 | Brookes |
| 9,746,570 B2 | 8/2017 | Mensch |
| 10,627,534 B2 | 4/2020 | Bernitsas |
| 2001/0005813 A1* | 6/2001 | Chambers ............... G01V 1/003 702/17 |
| 2016/0131785 A1 | 5/2016 | Tonchia |
| 2017/0017005 A1 | 1/2017 | Siliqi |
| 2017/0285197 A1* | 10/2017 | Bernitsas ............. G01V 1/3808 |
| 2017/0363760 A1 | 12/2017 | Mensch |

FOREIGN PATENT DOCUMENTS

| | | |
|---|---|---|
| WO | 2014195505 A2 | 12/2014 |
| WO | 2015011247 A1 | 1/2015 |
| WO | 2015175766 A1 | 11/2015 |

OTHER PUBLICATIONS

PCT Notification of Transmittal of the International Search Report and the Written Opinion of the International Searching Authority, or the Declaration for Application No. PCT/US2020/035928 dated Sep. 21, 2020.

\* cited by examiner

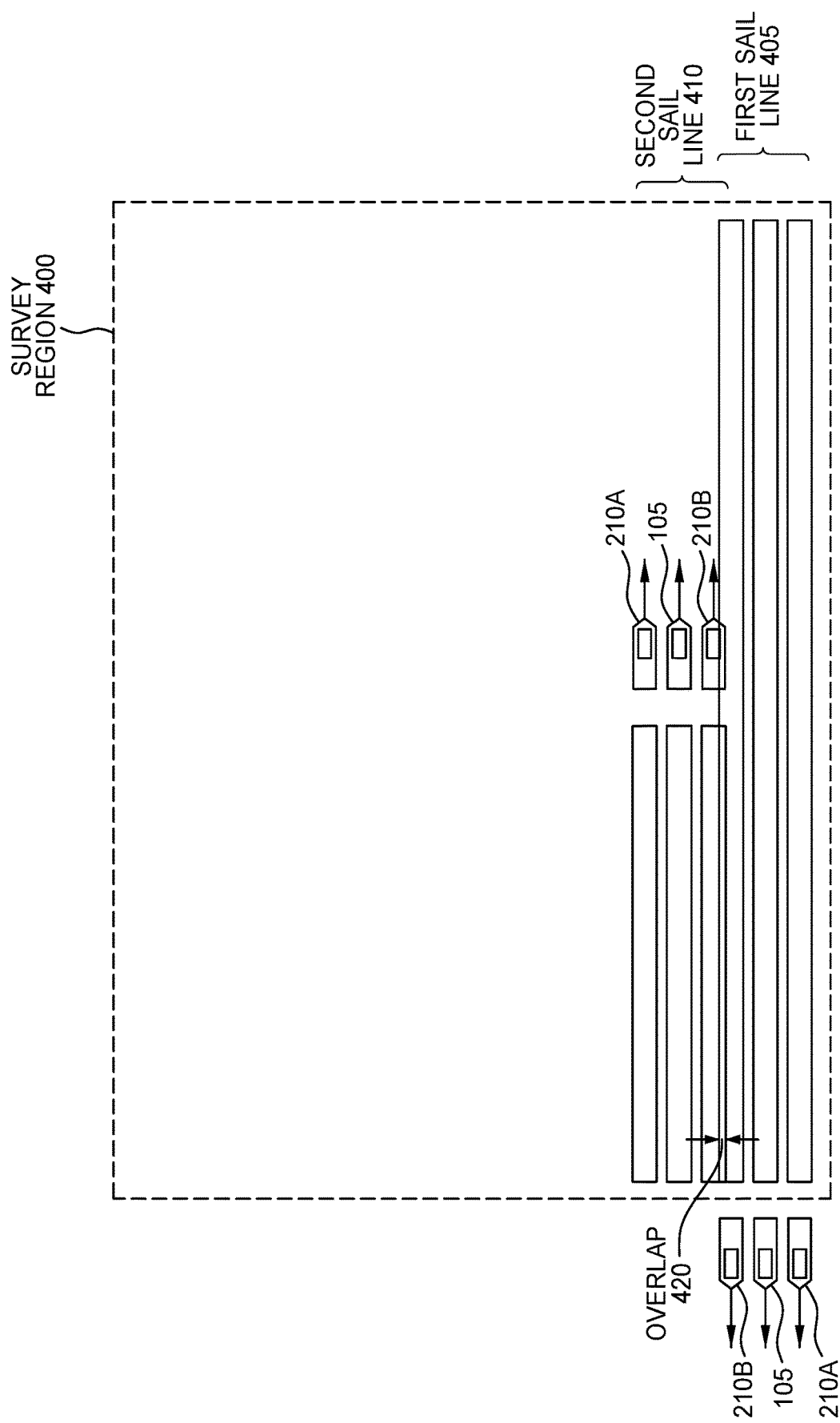

SPARSE SEISMIC DATA ACQUISITION

CROSS-REFERENCE TO RELATED APPLICATIONS

This application claims benefit of co-pending U.S. Provisional Patent Application Ser. No. 62/856,680, filed June 3, 2019. The aforementioned related patent. application is herein incorporated by reference in its entirety.

TECHNICAL FIELD

The present invention generally relates to seismic acquisition and, more specifically, to conducting reconnaissance marine seismic surveys.

BACKGROUND

Underwater oil and gas reserves (i.e., marine oil and gas reserves) are typically located by conducting surveys utilizing, among other things, seismic and other wave exploration techniques. These seismic exploration techniques often include controlling the emission of seismic energy into the Earth with a seismic source of energy (e.g., explosives, air guns, vibrators, etc.), and monitoring the Earth's response to the seismic source with one or more receivers to create an image of the subsurface of the Earth.

Conventional marine seismic surveys generally involve towing one or more streamer cables each carrying one or more receivers behind an acquisition vessel. Each receiver includes, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By generating geophysical data corresponding to the reflected seismic wavefield during the survey, the data can be used to form an image indicating the composition of the subsurface of the Earth near the survey location.

It can be very expensive to acquire and process the data collected in towed-streamer marine seismic surveys because of, e.g., the large amount of equipment and coordination required to plan and carry out a towed-streamer survey. Conventional 3D towed-streamer acquisition geometries typically include 5-15 streamers towed, together with one or more sources, behind an acquisition vessel, with the streamers spaced at 50-100 meters and towed at a depth of about 10 meters. The vessels usually tow the streamers in a "racetrack" geometry, with swaths defined by the streamers overlapping by 50% or more in successive acquisition lines. In many cases, the reason for such large overlap is because of the relatively sparse coverage in the near offset range (i.e., for the receivers closest to the vessel and source) that needs to be infilled in subsequent sail lines (or passes).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 4A-4B are diagrams of performing subsequent sail lines with different spacing, in embodiments described herein.

To facilitate understanding, identical reference numerals have been used, where possible, to designate identical elements that are common to the figures. It is contemplated that elements disclosed in one embodiment may be beneficially used in other embodiments without specific recitation.

SUMMARY

Figure 1A:
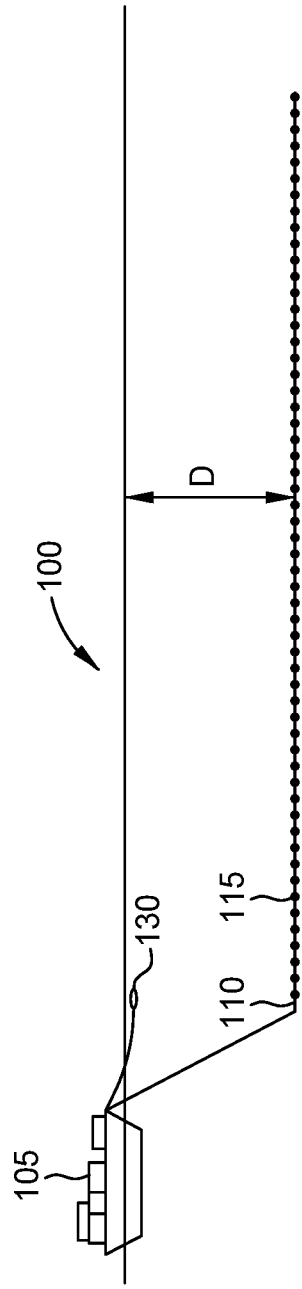
FIGS. 1A-1B are diagrams of a reconnaissance marine seismic survey system, in embodiments described herein.

One embodiment presented in this disclosure is a method that includes towing a plurality of receivers and a first seismic source behind a first vessel and acquiring, using the plurality of receivers, first survey data resulting from activating the first seismic source where the first survey data corresponds to a first coverage area of a subsurface below a bottom surface of a body of water. The method also includes towing a second seismic source behind a second vessel, acquiring, using the plurality of receivers, second survey data resulting from activating the second seismic source where the second survey data corresponds to a second coverage area of the subsurface, and controlling a separation distance between the first and second vessels to result in a desired gap between the first and second coverage areas.

Another embodiment presented herein is a non-transitory computer readable medium storing code, wherein, when executed by a computer processor, the code performs an operation comprising towing a plurality of receivers and a first seismic source behind a first vessel and acquiring, using the plurality of receivers, first survey data resulting from activating the first seismic source where the first survey data corresponds to a first coverage area of a subsurface below a bottom surface of a body of water. The operation also includes towing a second seismic source behind a second vessel, acquiring, using the plurality of receivers, second survey data resulting from activating the second seismic source where the second survey data corresponds to a second coverage area of the subsurface, and controlling a separation distance between the first and second vessels to result in a desired gap between the first and second coverage areas.

Another embodiment presented herein is a survey system that includes a first vessels configured to tow a plurality of receivers and a first seismic source and acquire, using the plurality of receivers, first survey data resulting from activating the first seismic source, wherein the first survey data corresponds to a first coverage area of a subsurface below a bottom surface of a body of water. The survey system also includes a second vessel configure to tow a second seismic source. The first vessel is configured to acquire, using the plurality of receivers, second survey data resulting from activating the second seismic source, where the second survey data corresponds to a second coverage area of the subsurface and the first and second vessels are configured to control a separation distance to result in a desired gap between the first and second coverage areas.

DETAILED DESCRIPTION

Embodiments herein use an acquisition vessel towing a plurality of receivers and a seismic source and one or more source vessels towing a seismic source to acquire seismic data representing geologic features in a subsurface below a bottom surface of a body of water. When activating the seismic source on the acquisition vessel, the plurality of receivers acquire survey data for a central coverage area that is generally located underneath a swath defined by the plurality of receivers. However, when activating the seismic source on the source vessel, the plurality of receivers towed by the acquisition vessel acquires survey data for a side coverage area that is outside the swath, or only partially overlapped by the swath.

To reduce cost and the time required to traverse a survey region, the embodiments herein control a separation distance between the acquisition and source vessels so that there is a gap between the central and side coverage areas resulting from activating the seismic sources towed by those vessels. This gap represents a region where the receivers do not acquire survey data for the geologic features in the subsurface. Although this gap can affect the seismic survey generated from the acquired survey data, the seismic survey may still be sufficient to identify geologic features of interest—e.g., oil and gas reservoirs. Thus, purposefully generating gaps between the coverage areas is a tradeoff between reducing the cost and time required to perform the seismic survey and the accuracy of the seismic survey.

FIG. 1A illustrates an example of a marine seismic acquisition system 100 suitable for reconnaissance seismic surveys. The system 100 includes an acquisition vessel 105 towing a plurality of streamers 110. Each of the streamers 110 includes a plurality of receivers 115 disposed along a cable, and each of the receivers 115 includes one or more sensors, such as a pressure sensor or a particle motion sensor. As shown in FIG. 1A, the streamers 110 may be towed at a depth D. For example, the streamers 110 may be towed at a depth of 20-30 meters. In some embodiments, the streamers 110 may be variable depth or slanted streamers, with the receivers 115 on a single streamer being towed at a plurality of different depths.

The system 100 also includes one or more seismic sources 130 that are towed with the streamers 110. The seismic sources 130 can be any source (e.g., explosives, air guns, vibration sources, or combinations thereof) that generates seismic energy for performing a marine seismic survey. FIG. 1A illustrates the sources 130 being towed by the acquisition vessel 105. In other examples, however, an independent source vessel may tow the sources 130. In either instance, the sources 130 may be towed such that the seismic sources 130 are generally in front of or near the front of the streamers 110. In an alternative embodiment, the seismic sources 130 may be towed so as to be above the streamers 110. At different points during the survey, the sources 130 may be positioned directly over various receivers 115 of the streamers 110, thus allowing for zero-offset and near-offset measurements to be made corresponding to the sources 130. In this alternative embodiment, the streamers 110 are generally towed at a depth D that operationally allows for the sources 130 to be towed above the streamers 110 without tangling or causing other overlapping problems. However, the sources 130 need not be towed above the streamers 110, and may be positioned either below the streamers 110 or at the same level as the streamers 110.

Figure 1B:
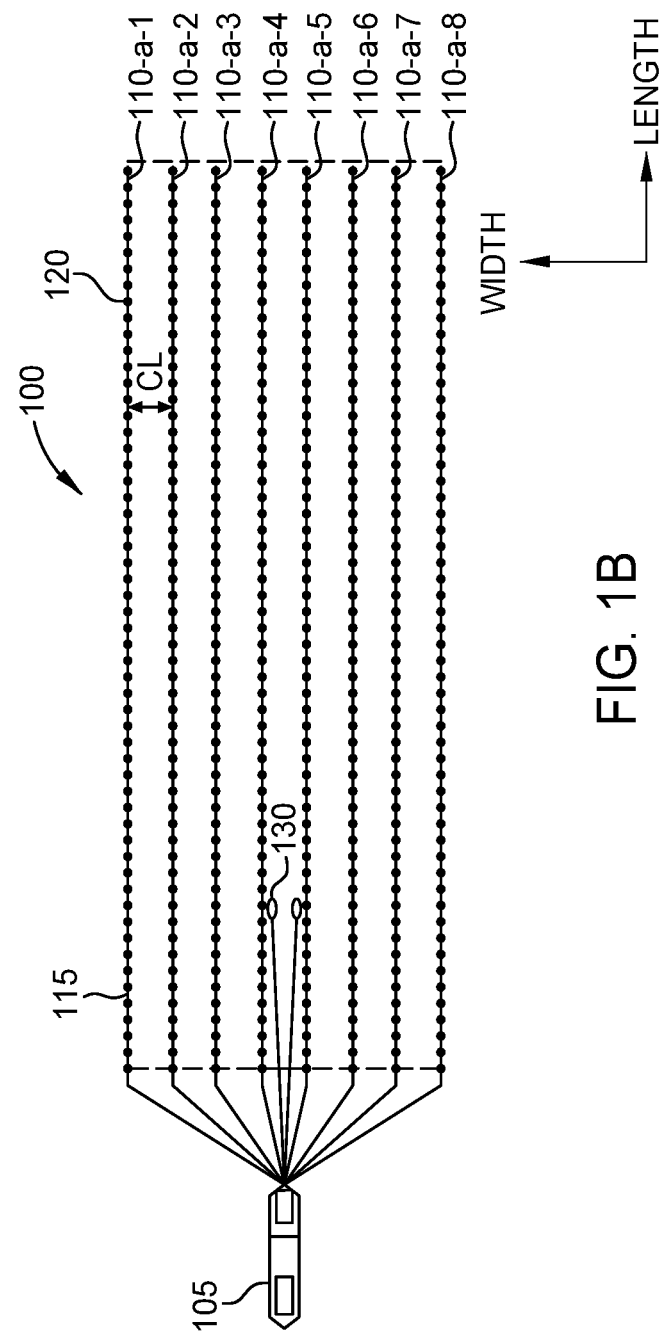

FIG. 1B illustrates a top-down view of the system 100 of FIG. 1A. Thus, FIG. 1B illustrates the acquisition vessel 105 towing the plurality of streamers 110. Each of the streamers 110 includes a plurality of receivers 115, and each of the receivers 115 includes one or more sensors, such as a pressure sensor or a particle motion sensor. The streamers 110-a-1, 110-a-2, 110-a-3, 110-a-4, 110-a-5, 110-a-6, 110-a-7, 110-a-8 are spaced apart from each other via a crossline offset spacing CL. The crossline offset spacing CL may have an effect on the sparsity of data collected by the receivers 115. A larger crossline offset spacing CL may result in a sparser data set, while a smaller crossline offset spacing CL may result in a less sparse data set. Other factors, however, may also contribute to the sparsity of a collected data set and may partially or completely mitigate the crossline offset spacing CL. In one example, a crossline offset spacing CL of 150 meters may be used. In other examples, a more narrow crossline offset spacing CL may be used. Also, while eight streamers 110-a-1, 110-a-2, 110-a-3, 110-a-4, 110-a-5, 110-a-6, 110a-7, 110a-8 (collectively referred to as streamers 110) are shown in FIG. 1B, this is merely illustrative, and more or fewer streamers may be towed by the acquisition vessel 105.

The plurality of streamers 110 define a swath 120, which covers an area defined by the overall width of the streamers 110 and the length of the streamers 110 that contain the receivers 115, as shown by the dashed line. More specifically, the swath 120 may be defined in some embodiments as the width between the leftmost and rightmost receiver 115 on the streamers 110 when towed over a given subsurface region. It is generally understood that a mid-point coverage that the subsurface data coverage (e.g., spacing of the Common MidPoint (CMP) bins in the subsurface region) in the presence of additional seismic energy sources (which is discussed later) may be wider or narrower than the width of the swath 120 (i.e., the width of the streamers 110).

FIG. 1B illustrates the vessel 105 towing multiple sources 130. While two sources 130 are illustrated in FIG. 1B, the number of sources 130 towed by the acquisition vessel 105 may be one, or may be more than two. The towed sources 130 may be independent of each other, meaning that the sources 130 may not be electronically synchronized. Alternatively, the sources 130 may be synchronized with each other in some form such that are activated to generate seismic energy at the same time or in a pattern. Towing multiple independent sources 130 over the streamers 110 may provide several different advantages. For example, the multiple sources 130 may provide a greater diversity of CMP coverage data because of the greater number of source-receiver pairs available. Multiple sources 130 may also allow one of the sources 130 to be taken temporarily out of service (e.g., if the source 130 is malfunctioning or needs service) while the other source(s) 130 continue to operate. In some embodiments, location of the sources 130 relative to the vessel 105 may be adjusted to account for the source 130 that was taken out of service. Allowing additional sources 130 to continue to operate after one source 130 is taken out of service may improve the overall availability of the system 100 to continue to acquire seismic data because, for example, if only a single source was used and that single source is taken offline, the acquisition may need to be stopped until the single source returns to service. Nonetheless, in some instances, only a single source 130 may be used.

Figure 2A:
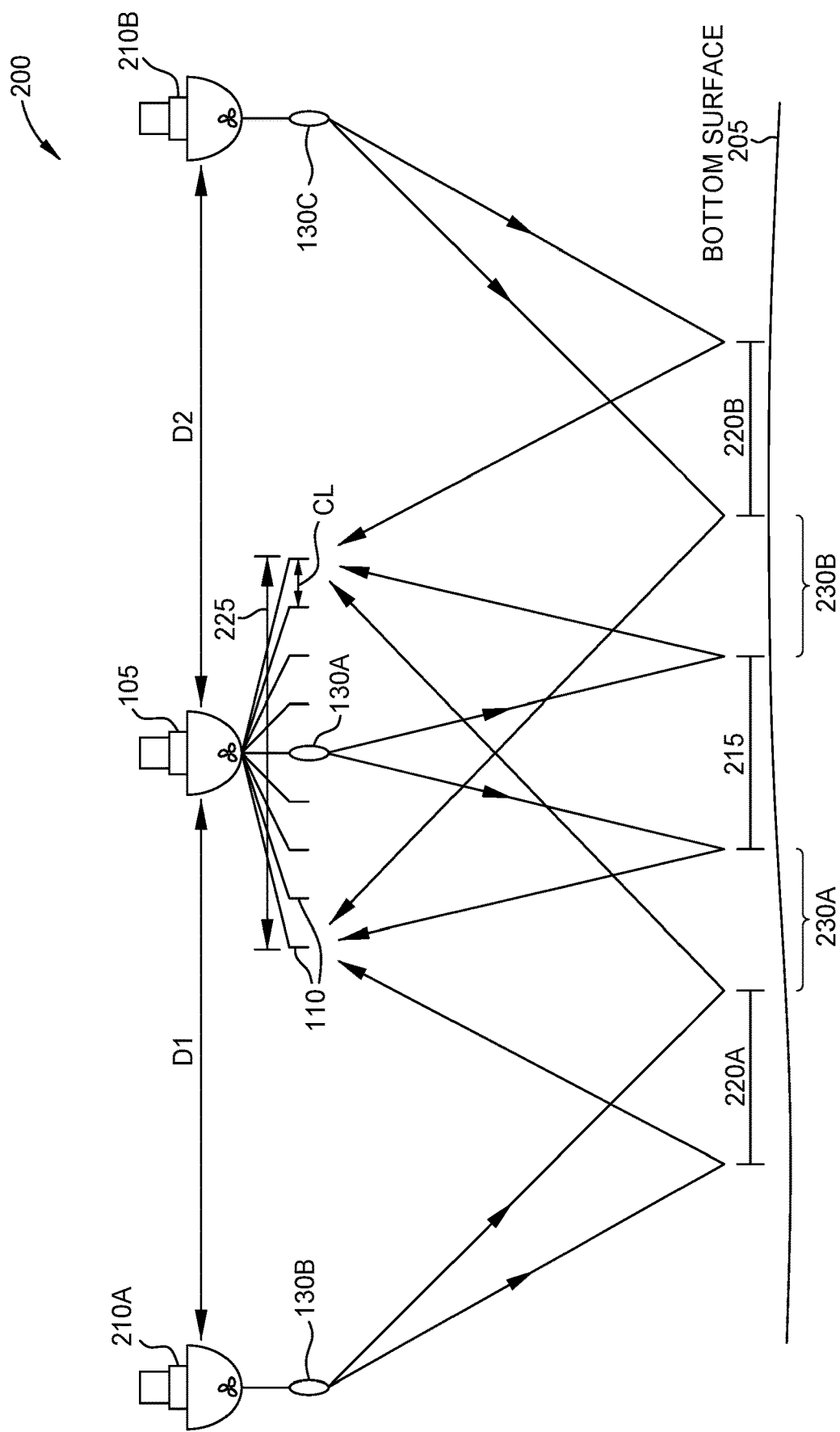
FIGS. 2A-2B are diagrams of a reconnaissance marine seismic survey system with different vessel spacing, in embodiments described herein.
Figure 2B:
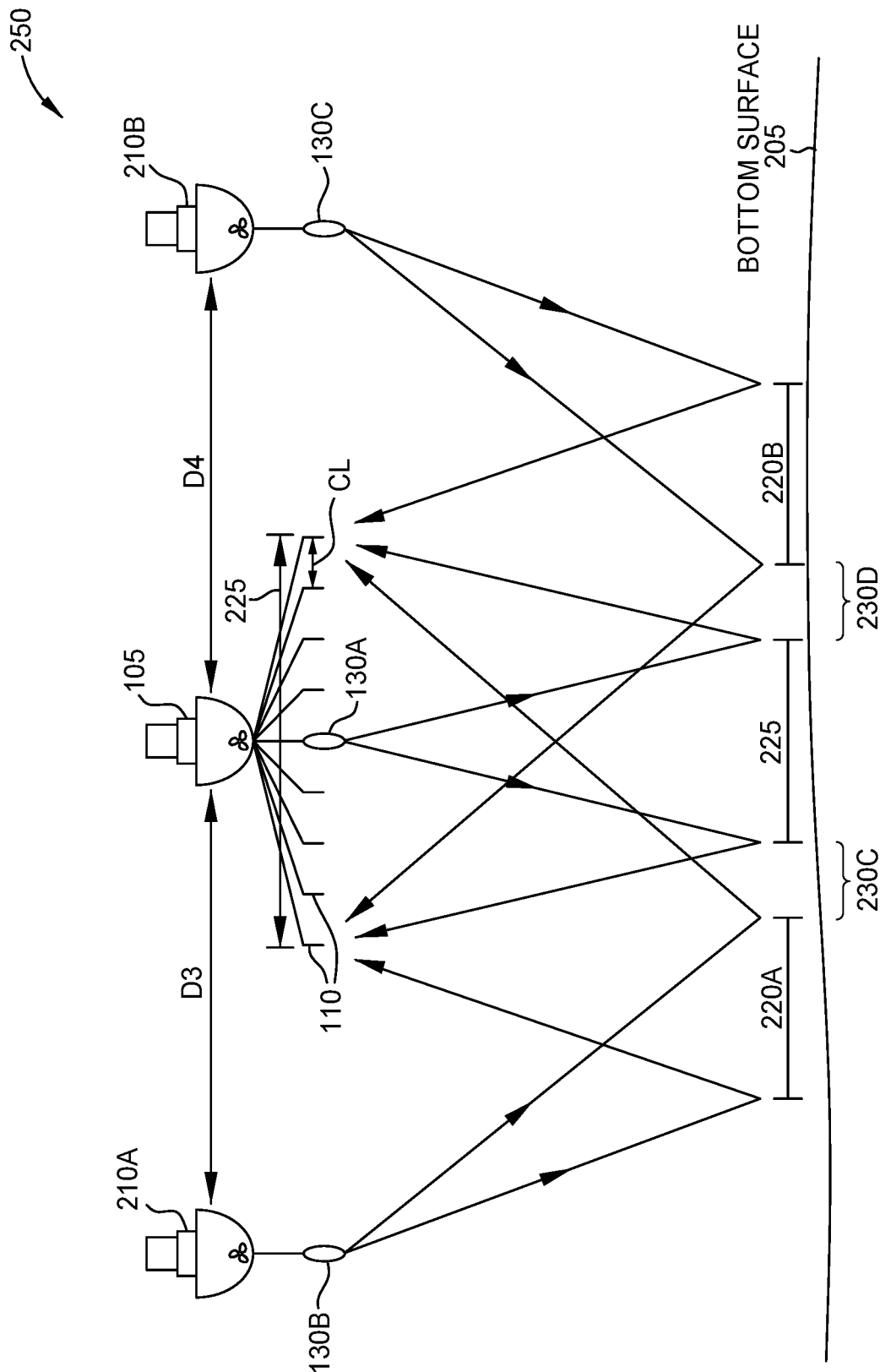

FIGS. 2A-2B are diagrams of a reconnaissance marine seismic survey system with different vessel spacing, in embodiments described herein. FIG. 2A illustrates a system 200 that includes an acquisition vessel 105 towing the streamers 110 and the source 130A, which were described in FIGS. 1A and 1B above. For clarity, FIG. 2A illustrates the vessel 105A towing only one source 130A, but could tow any number of sources as described above. Further, the numbers of streamers 110 may vary from the number actually illustrated in FIG. 2A. In any case, the streamers 110 each include at least one receiver (not shown) configured to receive seismic energy produced by the source 130A reflected off of geologic features in a subsurface below a bottom surface 205 of a body of water (e.g., geologic features in the subsurface). That is, seismic energy output by the source 130A may be received by the streamers 110 which in turn output survey data for a marine seismic survey.

In addition to the acquisition vessel 105, the system 200 includes a first source vessel 210A and a second source vessel 210B disposed on opposite sides of the vessel 105. Unlike the acquisition vessel 105, the source vessels 210A and 210B (collectively referred to as source vessels 210) do not tow streamers or receivers. Instead, in this embodiment, the source vessels 210 tow respective sources 130B and 130C which may be the same type, or different types, as the seismic source 130A towed by the acquisition vessel 105. While FIG. 2A illustrates the source vessels 210 towing one source 130, these vessels 210 may each tow two, three, or more sources 130 which may be synchronized or operate independently of each other. Further, the sources 130 on the different vessels 105, 210 may all be synchronized with each other or operate independently. For example, the sources 130A-C may be activated in a predefined pattern (e.g., first the source 130A, then the source 130B, then the source 130C, with a predefined delay between each activation), or the sources 130 may be activated at the same time.

The seismic energy emitted by the sources 130 generates three coverage areas on the subsurface below the bottom surface 205: a central coverage area 215, a first side coverage area 220A, and a second side coverage area 220B (collectively referred to as side coverage areas 220). That is, the seismic energy emitted by the source 130A (or any number of seismic sources towed behind the acquisition vessel 105, assuming these sources are generally located in the same area) reflects off features at or below the bottom surface 205 and is then reflected back towards a top surface of the body of water where it is detected by the receivers on the streamers 110. While the seismic energy emitted by the source 130A may also reflect in other directions than the one shown, this reflected seismic energy is not detected by the receivers on the streamers 110, and thus, does not generate data that can be used to generate a seismic survey of the geologic features in the subsurface (e.g., oil and gas reserves). As such, generating seismic energy using the source 130A generates survey data that can be used to identify geologic structures within the central coverage area 215.

Because the source vessels 210 are disposed on the left and right of the acquisition vessel 105, the seismic energy emitted by the sources 130B and 130C on these vessels 210 provides data that can be used to identify geologic structures within the side coverage areas 220, which are disposed to the left and right of the central coverage area 215. That is, the source 130B on the first source vessel 210A emits seismic energy that reflects off the geologic features in and below the bottom surface 205 (e.g., the subsurface) at the first side coverage area 220A which is then detected by the receivers on the streamers 110 towed by the acquisition vessel 105. Again, the seismic energy emitted by the source 130B reflects off of geologic features at other portions of the bottom surface 205, but generally these reflections are not detected by the receivers in the streamers 110, and thus, do not generate data that can be used to survey the bottom surface 205. As such, the first side coverage area 220A defines the portion of the bottom surface 205 where the seismic energy emitted by the source 130B can be used to reliably identify geologic features.

Similarly, the source 130C on the second source vessel 210B emits seismic energy that reflects off the geologic features in and below the bottom surface 205 at the second side coverage area 220B which is then detected by the receivers in the streamers 110 towed by the acquisition vessel 105. As with the sources 130A and 130B, the seismic energy emitted by the source 130C reflects off of geologic structures at other portions of the bottom surface 205, but generally these reflections are not detected by the receivers in the streamers 110, and thus, do not generate data that can be used to survey the bottom surface 205. As such, the second side coverage area 220B defines the portion of the bottom surface 205 where the seismic energy emitted by the source 130C can be used to reliably identify geologic features during a marine survey.

In FIG. 2A, the width 225 of the swath formed by the streamers 110 is greater than the width of the central coverage area 215. Because the source 130A is located close to the middle of the streamers 110, the central coverage area 215 generated from the seismic energy emitted by the source 130A has a smaller width than the width 225 of the swath (which is defined by the combined separation distances CL of the individual streamers). Adding the source vessels 210 increases the total coverage area of the survey (e.g., the combination of the central coverage area 215 and the side coverage areas 220) without having to add additional streamers 110. That is, the source vessels 210 can tow only sources 130. Further, the side coverage areas 220 may be wider than the central coverage area 215. Thus, adding the source vessels 210 can decrease the cost and time relative to a survey system relying solely on the acquisition vessel 105 to survey the same sized area.

In addition, FIG. 2A illustrates separation distances D1 and D2 between the acquisition vessel 105 and the source vessels 210 that are set to result in gaps 230A and 230B between the coverage areas 215, 220. That is, the separation distance D1 between the acquisition vessel 105 and the first source vessel 210A results in the gap 230A between the central coverage area 215 and the first side coverage area 220A, while the separation distance D2 between the acquisition vessel 105 and the second source vessel 210B results in the gap 230B between the central coverage area 215 and the first side coverage area 220B. The gaps 230A, 230B represent portions of the bottom surface 205 where the system 200 does not acquire survey data. That is, the seismic energy emitted by the sources 130 that reflects off the geologic features in the gaps 230A and 230B is generally not captured by the receivers in the streamers 110. As such, the streamers 110 do not acquire survey data regarding the portions of the bottom surface 205 in the gaps 230A and 230B.

While the system 200 does not acquire seismic data for the gaps 230A and 230B, the system 200 can traverse a survey region faster than a similar system where the spacing between the vessels 105, 210 are such that there are no gaps between the central coverage area 215 and the side coverage areas 220 (e.g., where the distances D1 and D2 are reduced). That is, assuming the vessels 105, 210 move at the same speed, the gaps 230A and 230B permit the system 200 to traverse the survey region faster since the area of the bottom surface 205 in the gaps 230A, 230B is not surveyed. Thus, the system 200 represents a tradeoff between acquiring survey data for the entire survey region and reducing the amount of time required to survey the region. Reducing the survey time may significantly reduce the cost of the survey. Further, as described below, the gaps may not have a significant negative impact on the accuracy of the survey. That is, the resulting marine seismic survey may be sufficient to identify geological structures, e.g., oil and gas reservoirs, even though there are gaps is the acquired survey data.

In one embodiment, the gaps 230A and 230B at least partial overlap with the swath. That is, the gaps 230A and 230B are at least partially covered by the width 225 of the swatch defined by the streamers 110. In one embodiment, first portions of the gaps 230A and 230B are within the width 225 of the swath while second portions of the gaps 230A and 230B extend beyond the width 225 of the swath. However, in another embodiment, the gaps 230A and 230B may be completely within the width 225 of the swath.

Further, one of the gaps 230A or 230B may be partially covered by the width 225 of the swath while the other gap is entirely within the width 225 of the swath. That is, the distance D1 may be set so that at least a portion of the gap 230A is within the width 225 of the swath while the distance D2 is set so that all of the gap 230B is within the width 225 of the swath. In that example, the distances D1 and D2 are different which causes the widths of the gaps 230A and 230B to be different. For example, if the distance D1 is greater than D2, the gap 230A may be wider than gap 230B (assuming the topography of the bottom surface 205 and the water depth is constant). If the distances D1 and D2 are the same, than the widths of the gaps 230A and 230B are generally the same (again assuming similar topography and water depth).

FIG. 2B illustrates a survey system 250 that is similar to the system 200 in FIG. 2A except that the distances between the acquisition vessel 105 and the first and second source vessels 210 have been reduced. That is, the distance D3 is smaller than the distance D1 in FIG. 2A and the distance D4 is smaller than the distance D2 in FIG. 2A. Reducing the distance between the acquisition vessel 105 and the source vessels 210 has a corresponding effect on the locations of a third side coverage area 220C and a fourth side coverage area 220D on the bottom surface 205. In this example, the smaller distances D3 and D4 moves the side coverage areas 220C and 220D such that they are at least partially overlapped by the width 225 of the swath. That is, unlike in FIG. 2A where the side coverage areas 220A and 220B are not overlapped by the width 225, in FIG. 2B side coverage areas 220C and 220D have portions overlapped by the swath while other portions of the areas 220C and 220D are not. The location and size of the central coverage area 215 is generally unaffected by reducing the separation distances D3 and D4 since this area 215 is primarily defined by the relative locations of the streamers 110 and the source 130A disposed on the acquisition vessel 105.

Moving the side coverage areas 220C and 220D closer to the central coverage area 215 shrinks the gaps 230C and 230D relative to the gaps 230A and 230B in FIG. 2A. In this example, both the gaps 230C and 230D are entirely disposed within the width 225 of the swath. In one embodiment, the separation distances D3 and D4 may be equal, in which case the width of the gaps 230C and 230D may be equal (assuming the topography and the water depth is generally the same). However, the separation distances D3 and D4 can be different which can result in the gaps 230C and 230D being different.

Figure 3A:
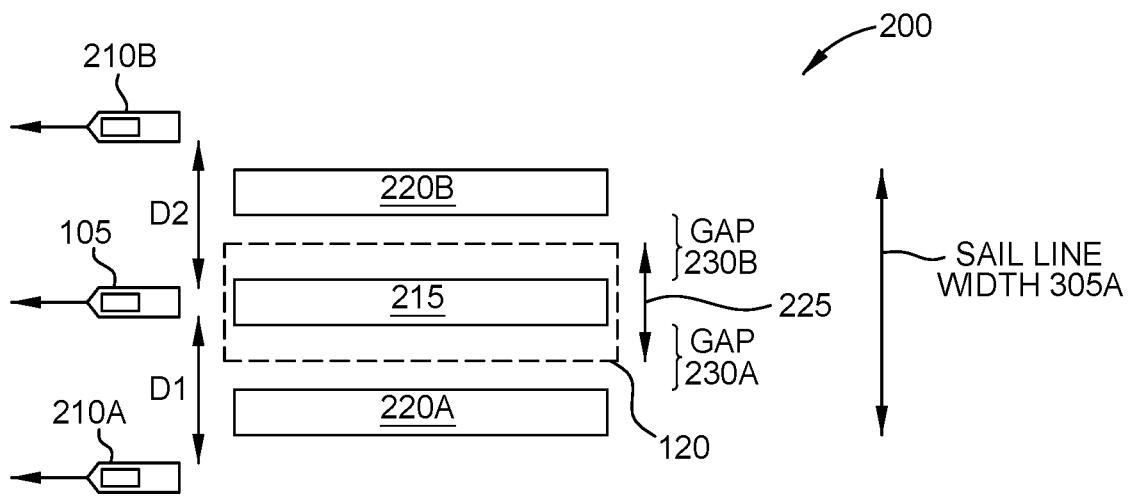
FIGS. 3A-3B are diagrams of a reconnaissance marine seismic survey system with different vessel spacing, in embodiments described herein.
Figure 3B:
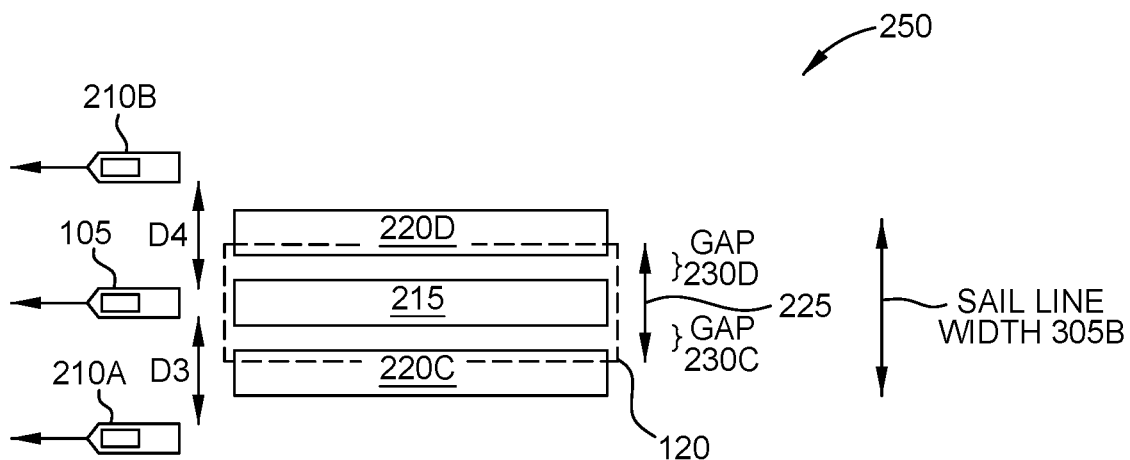

FIGS. 3A-3B are diagrams of a reconnaissance marine seismic survey system with different vessel spacing, in embodiments described herein. Specifically, FIG. 3A illustrates a top view of the system 200 in FIG. 2A while FIG. 3B illustrates a top view of the system 250 in FIG. 2B.

In FIG. 3A, the first and source vessels 210 are spaced apart from the acquisition vessel 105 by the distances D1 and D2. As a result, the first and second coverage areas 220A and 220B are disposed outside of the area defined by the swath 120. Thus, the gaps 230A and 230B, which define the separation distances between the central coverage area 215 and the first and second coverage areas 220A and 220B, include portions within the swath 120 and portions outside of the swath 120.

The distance from the top of the second side coverage area 220B to the bottom of the first side coverage area 220A defines a sail line width 305A. As the vessels 105, 210 move to the left as shown in FIG. 3A, the sail line width 305A indicates the area for which the system 200 acquires survey data for the geological features at and below the bottom surface (excluding the gaps 230A and 230B).

In FIG. 3B, the first and source vessels 210 are spaced apart from the acquisition vessel 105 by the distances D3 and D4. As a result, the third and fourth coverage areas 220C and 220D are disposed, at least partially, inside the area defined by the swath 120. Thus, the gaps 230C and 230D are contained within (or overlapped by) the swath 120.

The distance from the top of the second side coverage area 220D to the bottom of the first side coverage area 220C defines a sail line width 305B. As the vessels 105, 210 move to the left, the sail line width 305B indicates the area for which the system 250 acquires seismic data for the geological features at and below the bottom surface (excluding the gaps 230C and 230D). In this example, the sail line width 305A is larger than the sail line width 305B. As a result, the system 200 in FIG. 3A may be able to traverse the same sized survey region faster than the system 250 in FIG. 3B (assuming the vessels move at the same speed). However, this comes at the cost of larger gaps 230A and 230B in the system 200 relative to the gaps 230C and 230D in the system 250.

Figure 4A:
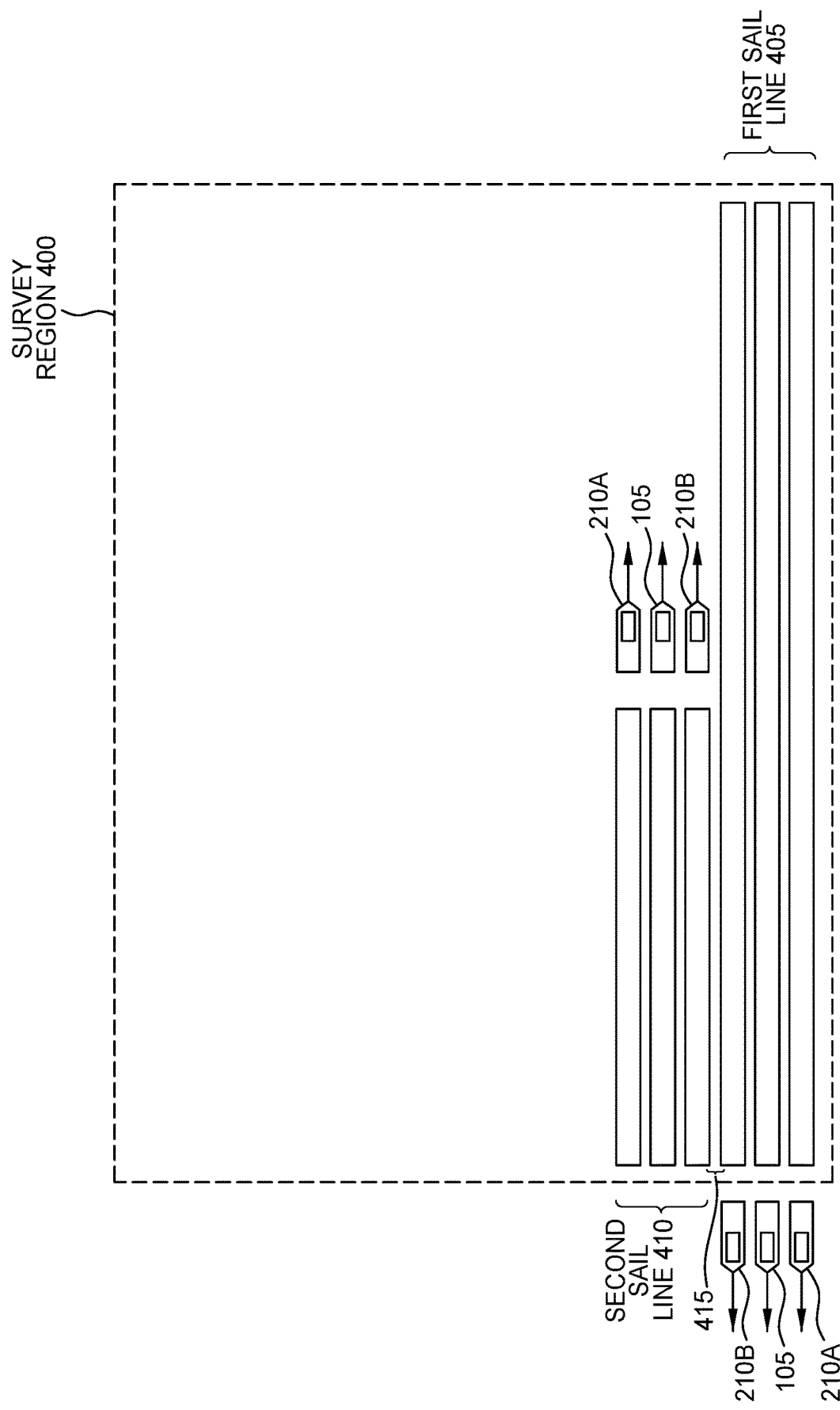

FIGS. 4A-4B are diagrams of performing subsequent sail lines with different spacing, in embodiments described herein. FIG. 4A illustrates a survey region 400 which is being surveyed by the vessels 105, 210 discussed above. FIG. 4A illustrates the vessels 105, 210 performing a first sail line 405 and a second sail line 410. In this example, the vessels 105, 210 have completed the first sail line 405, turned around, and have partially completed the second sail line 410. Further, when completing the first and second sail lines 405, 410, the source vessels 210 are spaced apart from the acquisition vessel 105 such that the central coverage area in each sail line 405, 410 is separated from side coverage areas by gaps as discussed above. While FIGS. 4A-4B illustrate the vessels 105, 210 performing subsequent horizontal sail lines to traverse the survey region 400, other traversal techniques may be used instead such as sailing around the sides of the region 400 to form a spiral pattern until reaching a middle of the region 400, or using a zig-zag pattern.

In addition to separating the central and side coverage areas within the sail lines 405, 410 by gaps, FIG. 4A illustrates that subsequent sail lines can be separated by a gap 415. That is, after completing the first sail line 405, the locations of the vessels 105, 210 in the survey region 400 when performing the second sail line can be set such that the upper side coverage area in the first sail line 405 is separated by the gap 415 from the lower side coverage area in the second sail line 410. In one embodiment, the width of the gap 415 may be the same as the widths of the gaps between the central and side coverage areas within the sail lines 405, 410. However, in other embodiments, the gap 415 may be different (larger or smaller) than the gaps within the sail lines 405, 410.

FIG. 4B illustrates the vessels 105, 210 performing the first and second sail lines 405, 410 in the same survey region 400 as in FIG. 4A. However, rather than a gap between the subsequent sail lines, when performing the second sail line 410, the vessels 105, 210 are located in the survey region 400 such that the lower side coverage area in the second sail line 410 at least partially overlaps with the upper side coverage area in the first sail line 405. This overlap 420 indicates that the vessels 105, 210 acquire seismic data for the area defined by the overlap 420 when performing the first sail line 405 and when performing the second sail line 410. In another embodiment, the locations of the vessels 105, 210 when completing the first and second sail lines 405, 410 may be controlled so that the lower side coverage area of the second sail line 410 abuts the upper side coverage area of the first sail line 405 so that there is very little overlap or only a very small gap between the first and second sail lines 405, 410.

Figure 5:
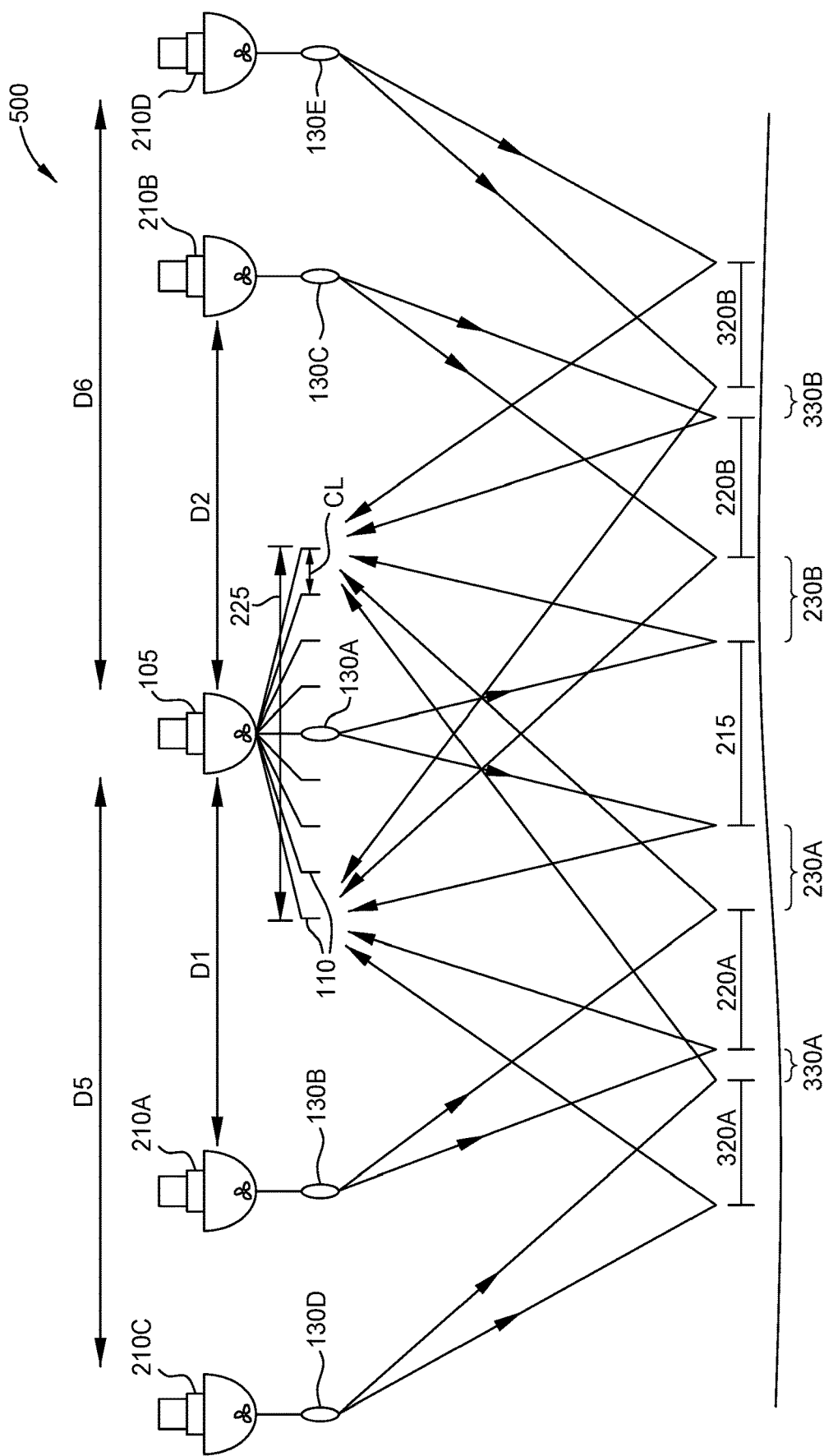
FIG. 5 is a diagram of a reconnaissance marine seismic survey system, in one embodiment described herein.

FIG. 5 is a diagram of a reconnaissance marine seismic survey system 500, in one embodiment described herein. The survey system 500 includes the same vessels 105, 210 as in FIG. 2A which generate the same central and side coverage areas 215, 220 along with the gaps 230A and 230B. Thus, these components are not described in detail here.

The survey system 500 also includes a third source vessel 210C and a fourth source vessel 210D. The third source vessel 210C is disposed to the left of the first source vessel 210A. Stated differently, the first source vessel 210A is disposed between the third source vessel 210C and the acquisition vessel 105. The fourth source vessel 210D, on the other hand, is disposed to the right of the second source vessel 210B so that the second source vessel 210B is disposed between the fourth source vessel 210D and the acquisition vessel 105.

As shown, the third and fourth source vessels 210C and 210D tow respective seismic sources 130D and 130E. The seismic energy emitted by these sources 130D and 130E generate the side coverage areas 320A and 320B. That is, the seismic energy emitted by the sources 130D and 130E is reflected by the geologic structures within the coverage areas 320A and 320B and are received by the receivers on the streamers 110 towed by the acquisition vessel 105. While one seismic source is shown for each of the third and fourth source vessels 210C and 210D, these vessels can tow any number of sources.

Like the separation distances D1 and D2, the separation distance D5 between the third source vessel 210C and the acquisition vessel 105 and the separation distance D6 between the fourth source vessel 210D and the acquisition vessel 105 can be controlled so that the side coverage areas 320A and 320B are separated from the side coverage areas 220A and 220B by respective gaps 330A and 330B. Like with the gaps 230A and 230B, the size of the gaps 330A and 330B represent a tradeoff between acquiring seismic data for an entire survey region and the time required to traverse the survey region. As discussed below, the survey system 500 can include the gaps 330 and still provide a seismic survey with sufficient details to locate desired geologic features—e.g., gas and oil reservoirs.

The gaps 330A and 330B can have the same size as each other or different sizes. That is, the separation distances D5 and D6 may be the same or different. Further, the gaps 330A and 330B may have the same size as the gaps 230A and 230B, or the gaps 330A and 330B may have different sizes than the gaps 230A and 230B. For example, it may be desirable to have smaller gaps 330A and 330B since the coverage areas 320A and 320B are further from the receivers on the streamers 110 than the coverage areas 220A and 220B.

In an alternative embodiment, the separation distances D5 and D6 may be set so that the side coverage area 320A directly abuts (or slightly overlaps) the side coverage area 220A and the side coverage area 320B directly abuts (or slightly overlaps) the side coverage area 220B. That is, the survey system 500 may not have the gaps 330A and 330B but only include the gaps 230A and 230B between the side coverage areas 220A and 220B and the central coverage area 215.

While FIG. 5 illustrates a pair of source vessels 210 on each side of the acquisition vessel 105, in other embodiments, the survey system may include three, four, or more source vessels 210 on each side of the acquisition vessel that generate respective side coverage areas (that may have, or may not, have gaps with adjacent side coverage areas). In one embodiment, the survey system may have unequal numbers of source vessels on each side of the acquisition vessel 105. For example, a survey system may include one source vessel on one side of the acquisition vessel 105 but two (or more) source vessels on the other side of the acquisition vessel 105. Or a survey system may include two source vessels on one side of the acquisition vessel and three or more source vessels on the other side.

Figure 6:
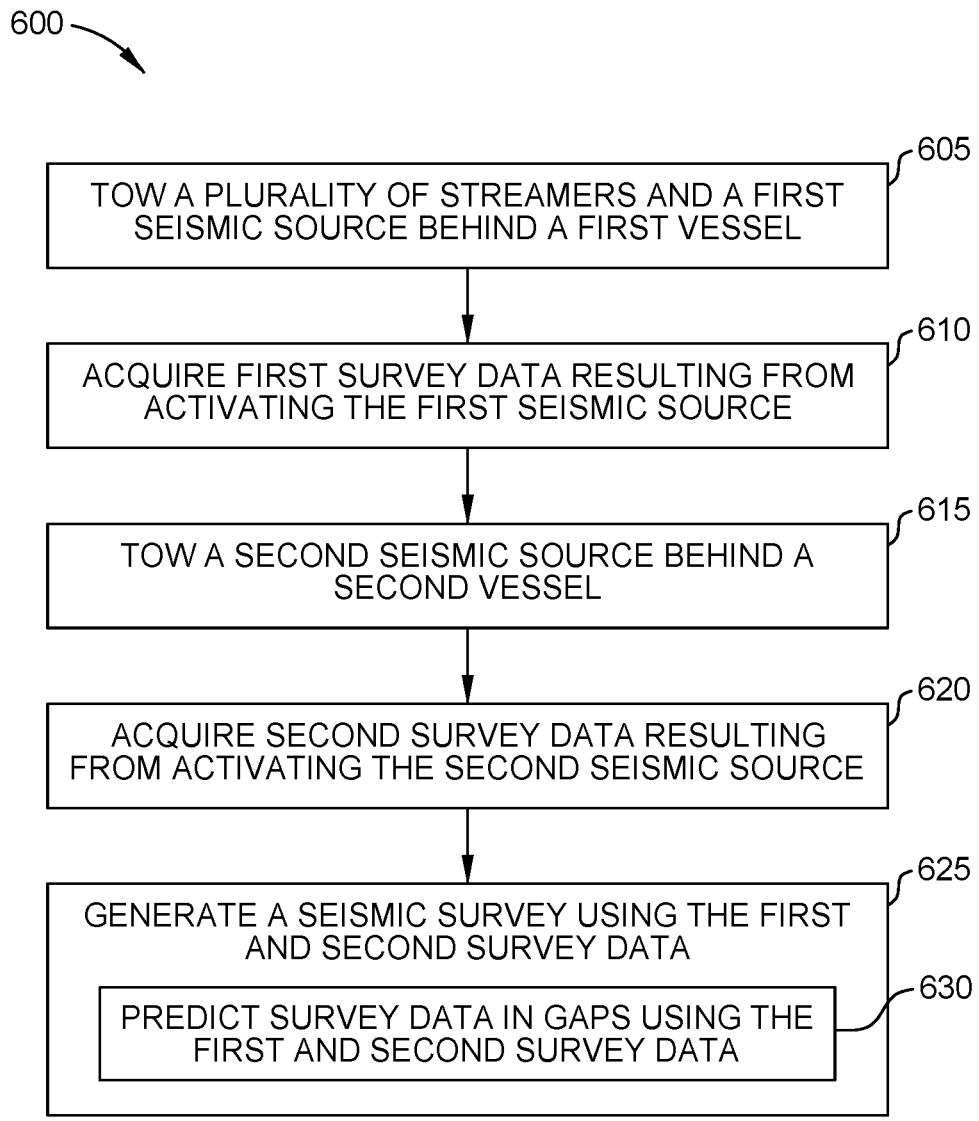
FIG. 6 is a flowchart for acquiring survey data using multiple vessels, in one embodiment described herein.

FIG. 6 is a flowchart of a method 600 for acquiring survey data using multiple vessels, in one embodiment described herein. At block 605, first vessel (e.g., an acquisition vessel) tows a plurality of streamers and a first seismic source. In one embodiment, each of the plurality of streamers includes a plurality of receivers that are distributed along the respective streamer (e.g., along a cable). While in one embodiment the first vessel includes a first seismic source, the first vessel can include any number of seismic sources. Alternatively, in one embodiment, the first vessel may not include any seismic sources. In that embodiment, the first vessel relies on seismic source(s) on a different vessel to acquire seismic data.

At block 610, the first vessel acquires first survey data resulting from activating the first seismic source. That is, the first seismic source generates seismic energy that is reflected off geologic features at or below a bottom surface of a body of water (e.g., in the subsurface). This reflected energy is then received by the receivers in the streamers. In one embodiment, the first survey data includes data corresponding to geologic features in the central coverage area 215 illustrated in the previous figures.

At block 615, a second vessel (e.g., a source vessel) tows a second seismic source. The second vessel can include more than one seismic source which may be synchronized such that the source emit seismic energy simultaneously or in a round-robin fashion. In one embodiment, the second vessel does not tow any receivers. That is, the second vessel may not include any devices that can acquire survey data corresponding to reflected seismic energy.

At block 620, the first vessel acquires second survey data resulting from activating the second seismic source. That is, the second vessel activates the second seismic source that generates seismic energy that reflects off of geologic features in or below the bottom surface of the body of water which is then received by the receivers on the streamers towed by the first vessel. In one embodiment, the second survey data includes data corresponding to geologic features in one of the side coverage areas 220 or 320 illustrated in the previous figures.

In one embodiment, there is a gap between the coverage area corresponding to the first survey data (e.g., the central coverage area) and the coverage area corresponding to the second survey data (e.g., a side coverage area). This gap may be disposed at least partially below (or overlapped by) a swath defined by the streamers. In another embodiment, the gap may be entirely disposed underneath the swath of the streamers. This gap represents an area of the bottom surface where the receivers do not acquire seismic data concerning the geologic features in that area.

In one embodiment, one or more computerize steering applications (e.g., computer readable medium storing code) control the vessels described above in order to tow the plurality receivers and seismic sources described in blocks 605 and 615. That is, the computerize steering applications can generate coarse headings and speed settings for steering the first and second vessels to the plurality of streamers and the seismic sources.

At block 625, a computing system generates a seismic survey using the first and second survey data. In one embodiment, the computing system generates a 3D regional scale seismic image of the geologic features in or below the bottom surface being surveyed using the first and second survey data. That is, the computing system can use one or more image processing applications to generate the 3D image (or images) using the first and second survey data.

As mentioned above, there may be gaps between the first and second survey data. This gap may be represented in the seismic survey generated from the survey data. For example, the 3D image representing the seismic survey may have gaps corresponding to the gaps between the coverage areas. Nonetheless, if there are gaps in the 3D image, a resolution of the image may be sufficient to identify geologic features in the bottom surface of body of water.

In one embodiment, at block 630, the computing system predicts survey data in the gaps using the first and second survey data. That is, instead of having gaps in the in the seismic survey (or the 3D images in the survey), the computing system may predict the seismic data corresponding to the gaps. In one embodiment, the computing system uses data regularization and interpolation to predict the seismic data or the geologic features in the gaps using the first and second survey data (or the geologic features identified from the first and second survey data). In this manner, the computing system can use image algorithms to fill in the gaps below the bottom surface. Although the quality of the data used to generate the seismic survey may be less accurate than data acquired without gaps between the coverage areas, adding gaps increase the size of the sail lines which can result in traversing a survey region quicker and reducing costs.

Figure 7:
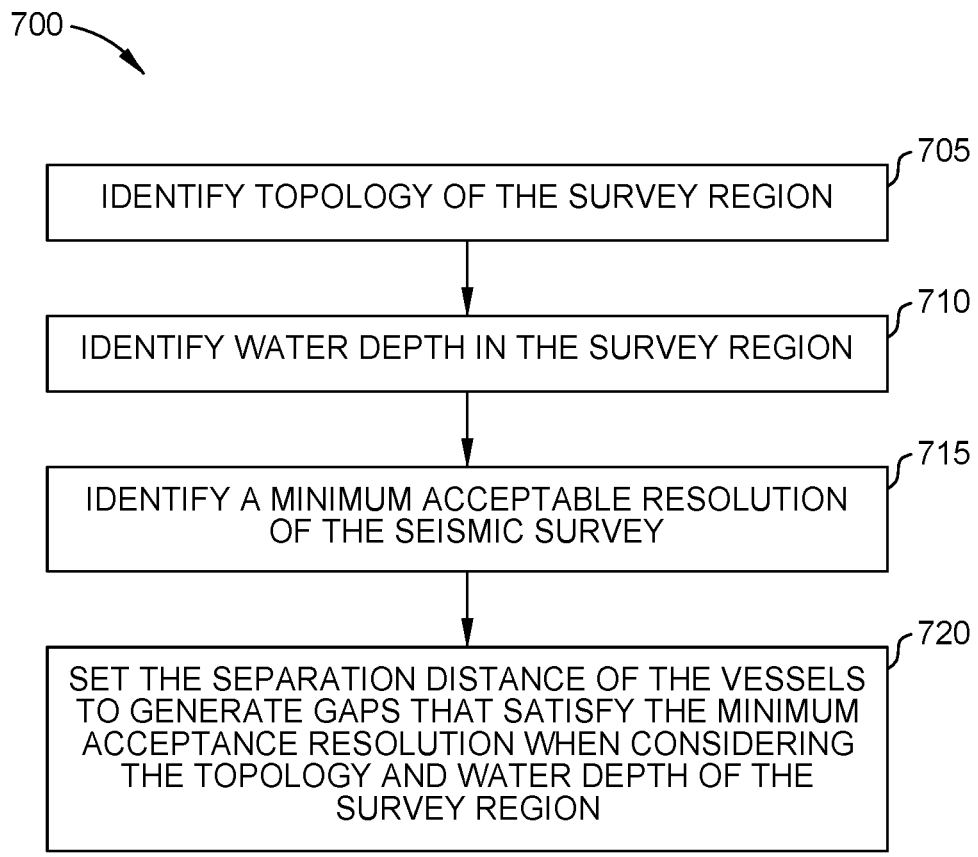
FIG. 7 is a flowchart for identifying a separation distance between vessels when acquiring survey data using multiple vessels, in one embodiment described herein.

FIG. 7 is a flowchart of a method 700 for identifying a separation distance between vessels when acquiring survey data using multiple vessels, in one embodiment described herein. In one embodiment, the method 700 is performed by a person (e.g., a surveyor) or a computing system to identify suitable gaps (e.g., desired gaps) between coverage areas which maximize the size of the sail lines (to reduce the time required to perform the survey) yet still result in 3D regional scale seismic image that identifies the geologic features in the survey region. For example, increasing the size of the gaps may increase the gaps in the resulting 3D images or reduce the resolution or accuracy of the 3D images. Nonetheless, the 3D images may be suitable to identify the geologic features of interest—e.g., gas and oil reservoirs.

At block 705, a surveyor or computing system identifies a topology of the survey region which can affect the size of the gaps between the coverage areas (or the gaps between subsequent sail lines). This topology can include the particular rock formations in the bottom surface, or whether the bottom surface is substantially flat or has a large trench or crag. For example, a survey system may be able to have larger gaps between coverage areas when the bottom surface is substantially flat in contrast to a surface that has multiple trenches or crags.

At block 710, the surveyor or computing system identifies water depth in the survey region. The depth of the body of water can also affect the size of the gaps that can result in suitable 3D images.

At block 715, the surveyor or computing system identifies a minimum acceptable resolution of the seismic survey. In one embodiment, the resolution may dictate the maximum size or number of gaps in the 3D images generated for the seismic survey. In another embodiment, the acceptable resolution dictates a minimum accuracy threshold for the gaps. This threshold may require that the predicted seismic data for the gaps have a minimum accuracy or confidence score which is then used to predict the geologic features in the gaps.

At block 720, the surveyor or computing system sets the separation distance of the vessels (e.g., the first and second vessels in method 600) to generate gaps that satisfy the minimum acceptable resolution when considering the topology and water depth of the survey region. That is, using the topology and water depth of the survey region identified at blocks 705 and 710, the surveyor or computing system identify a maximum separation distance that results in a gap that satisfies the minimum resolution identified at block 715. In this manner, the method 700 can maximize the size of the gaps between the coverage areas (which reduces costs) and still provides a customer with the 3D images with the desired resolution. The method 700 can also be used to identify the size of gaps between adjacent sails lines as shown in FIG. 4A.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
towing a plurality of receivers and a first seismic source behind a first vessel, wherein the first vessel tows a plurality of streamers, wherein multiple ones of the plurality of receivers are disposed along each of the plurality of streamers, and wherein the plurality of streamers define a swath;
acquiring, using the plurality of receivers, first survey data resulting from activating the first seismic source, wherein the first survey data corresponds to a first coverage area of a subsurface below a bottom surface of a body of water;
towing a second seismic source behind a second vessel;
acquiring, using the plurality of receivers, second survey data resulting from activating the second seismic source, wherein the second survey data corresponds to a second coverage area of the subsurface, wherein no portion of the second coverage area is overlapped by the swath; and
controlling a separation distance between the first and second vessels to result in a desired gap between the first and second coverage areas.

2. The method of claim 1, further comprising:
towing a third seismic source behind a third vessel;
acquiring, using the plurality of receivers, third survey data resulting from activating the third seismic source, wherein the third survey data corresponds to a third coverage area of the subsurface; and
controlling a separation distance between the first and third vessels to result in a second desired gap between the first and third coverage areas.

3. The method of claim 2, wherein the second vessel is located on a first side of the first vessel and the third vessel is located on a second, opposite side of the first vessel.

4. The method of claim 2, wherein the desired gap and the second desired gap have a same width.

5. The method of claim 2, further comprising:
towing a fourth seismic source behind a fourth vessel;
acquiring, using the plurality of receivers, fourth survey data resulting from activating the fourth seismic source, wherein the fourth survey data corresponds to a fourth coverage area of the subsurface; and
controlling a separation distance between the first and fourth vessels to result in a third desired gap between the fourth coverage area and one of the second and third coverage areas,
wherein one of the second vessel and the third vessel is between the first vessel and the fourth vessel.

6. The method of claim 1, further comprising:
traversing a survey region using a plurality of sail lines defined by the first and second coverage areas, wherein locations of the first and second vessels in the survey region are controlled so that there is a second desired gap between at least two of the plurality of sail lines.

7. The method of claim 1, further comprising:
generating a seismic survey using the first and second survey data, wherein the seismic survey comprises a gap corresponding to the desired gap.

8. The method of claim 1, further comprising:
predicting survey data corresponding to the desired gap based on the first and second survey data; and
generating a seismic survey using the first, second, and predicted survey data.

9. A non-transitory computer readable medium storing code, wherein, when executed by a computer processor, the code causes the processor to perform an operation comprising:
acquiring, using a plurality of receivers towed behind a first vessel, first survey data resulting from activating a first seismic source towed behind the first vessel, wherein the first vessel tows a plurality of streamers, wherein multiple ones of the plurality of receivers are disposed along each of the plurality of streamers, and wherein the plurality of streamers define a swath, and wherein the first survey data corresponds to a first coverage area of a subsurface below a bottom surface of a body of water; and
acquiring, using the plurality of receivers, second survey data resulting from activating a second seismic source towed behind a second vessel, wherein the second survey data corresponds to a second coverage area of the subsurface, wherein no portion of the second coverage area is overlapped by the swath, and wherein there is a desired gap between the first and second coverage areas.

10. The non-transitory computer readable medium storing code of claim 9, wherein a width of the first coverage area is contained within a width of the swath.

11. The non-transitory computer readable medium storing code of claim 9, wherein a first portion of the second coverage area is overlapped by the swath and a second portion of the second coverage area is not overlapped by the swath.

12. The non-transitory computer readable medium storing code of claim 9, wherein the operation further comprises:
acquiring, using the plurality of receivers, third survey data resulting from activating a third seismic source towed behind a third vessel, wherein the third survey data corresponds to a third coverage area of the subsurface, wherein there is a second desired gap between the first and third coverage areas,
wherein the second vessel is towed on a first side of the first vessel and the third vessel is towed on a second, opposite side of the first vessel.

13. A survey system, comprising:
a first vessel configured to:
tow a plurality of receivers, a plurality of streamers, and a first seismic source, wherein multiple ones of the plurality of receivers are disposed along each of the plurality of streamers, and wherein the plurality of streamers define a swath; and
acquire, using the plurality of receivers, first survey data resulting from activating the first seismic source, wherein the first survey data corresponds to a first coverage area of a subsurface below a bottom surface of a body of water; and
a second vessel configured to:
tow a second seismic source, wherein the first vessel is configured to acquire, using the plurality of receivers, second survey data resulting from activating the second seismic source, wherein the second survey data corresponds to a second coverage area of the subsurface, wherein no portion of the second coverage area is overlapped by the swath, and wherein the first and second vessels are configured to control a separation distance to result in a desired gap between the first and second coverage areas.

14. The survey system of claim 13, further comprising:
a third vessel configured to tow a third seismic source,
wherein the first vessel is configured to acquire, using the plurality of receivers, third survey data resulting from activating the third seismic source, wherein the third survey data corresponds to a third coverage area of the subsurface, wherein the first and third vessels are configured to control a second separation distance to result in a second desired gap between the first and third coverage areas.

15. The survey system of claim 14, wherein the second vessel is located on a first side of the first vessel and the third vessel is located on a second, opposite side of the first vessel.

16. The survey system of claim 14, wherein the desired gap and the second desired gap have a same width.

17. The survey system of claim 14, further comprising:
a fourth vessel configured to tow a fourth seismic source,
wherein the first vessel is configured to acquire, using the plurality of receivers, fourth survey data resulting from activating the fourth seismic source, wherein the fourth survey data corresponds to a fourth coverage area of the subsurface,
wherein the first vessel and the fourth vessel are configured to control a third separation distance to result in a third desired gap between the fourth coverage area and one of the second and third coverage areas.

18. The survey system of claim 14, wherein the first, second, and third vessels each tow multiple seismic sources.

* * * * *